Nov. 4, 1930.  F. KUHN  1,780,825
HANDLE ASSEMBLY
Filed Oct. 3, 1927
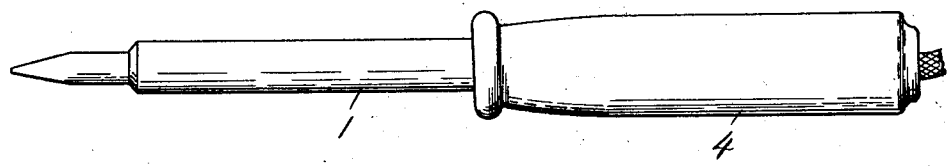
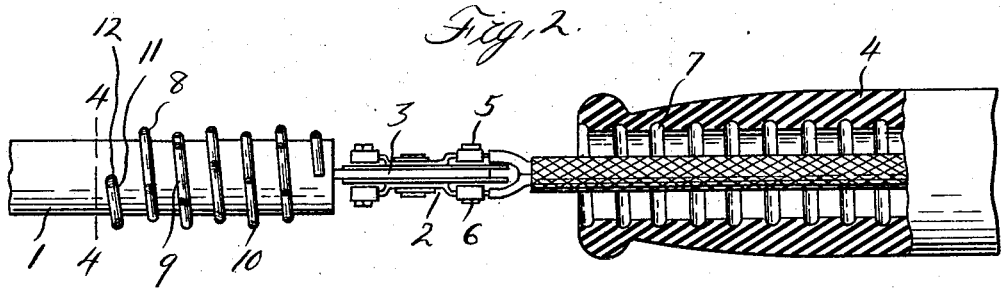
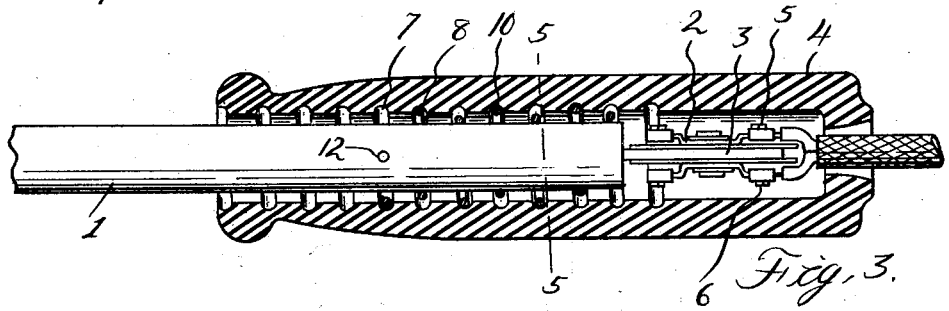
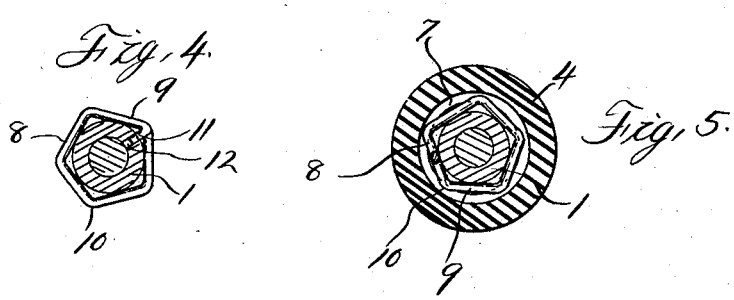
Inventor
Frank Kuhn
By Whittemore Hulbert
Whittemore & Belknap
Attorneys Patented Nov. 4, 1930

1,780,825

UNITED STATES PATENT OFFICE

FRANK KUHN, OF DETROIT, MICHIGAN, ASSIGNOR TO AMERICAN ELECTRICAL HEATER COMPANY, OF DETROIT, MICHIGAN, A CORPORATION OF MICHIGAN

HANDLE ASSEMBLY

Application filed October 3, 1927. Serial No. 223,733.

This invention relates generally to means for attaching handles to the shanks of tools, and refers more particularly to a means for attaching a handle to an electrically heated shank of a soldering iron.

One of the essential objects of the invention is to provide attaching means of this type that will enable the handle to be easily and quickly attached to or detached from the shank and that is constructed and arranged in such a way that direct heat conducting contact between the shank and the handle is interrupted.

In the accompanying drawings:

Figure 1 is an elevation of a tool embodying my invention;

Figure 2 is a view of the shank and helix with the handle removed therefrom;

Figure 3 is a longitudinal sectional view through the handle.

Figure 4 is a section on the line 4—4 of Figure 2.

Figure 5 is a section on the line 5—5 of Figure 3.

Referring now to the drawing, 1 is a shank, 2 is a terminal plate for an electrical conductor 3, and 4 is a handle of an electrical soldering iron. As shown the shank 1 is preferably a metal tube and is cylindrical in form. The terminal plate 2 is rigidly secured to and in alignment with the shank 1 at an end thereof, and carries suitable clamping means such as the screws 5 and 6 respectively for holding the wires of the electrical conductor 3. The handle 4 is a substantially cylindrical tube of non-conducting material such as rubber or rubber composition, and is provided throughout its length with an internal thread 7. Normally the handle 4 surrounds and conceals the terminal plate 2 and the adjacent end portion of the shank 1, and is detachably secured to the latter by means of a wire helix 8. As shown, this helix has flat portions 9 engaging the shank 1 and has projecting portions or corners 10 intermediate said flat portions engaging the thread 7 in the handle 4. Preferably an end of the helix is off-set as shown at 11 and engages an aperture 12 in the shank to prevent the helix from moving relative to the shank when for instance the handle is adjusted upon the helix.

In the process of construction the helix 8 is wound on a flattened mandrel and is of a size to bear with its flat portions 9 firmly against the shank 1 of the iron.

Thus from the foregoing description it will be apparent that I have provided a neat and durable handle assembly which is simple in construction and can be manufactured at a comparatively low cost. As the handle 4 engages only the projecting portions or corners 10 of the helix, the adjustment of the handle on the shank may be easily and quickly affected, and direct heat conducting contact between the shank and the handle is interrupted. Hence the handle 4 will not get so hot while the tool is in use.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In a handle assembly, a shank, a helix on the shank and having portions of certain convolutions thereof extending tangentially to said shank and providing at spaced points about the periphery of said shank substantially V-shaped portions with the apices of the V's projecting outwardly with respect to said shank, and a handle threadedly engaging the apices of the V-shaped portion aforesaid.

2. In a handle assembly, a handle having an internal thread, a shank, a helix upon the shank having substantially straight portions extending tangentially to and bearing against the shank and having outwardly projecting portions intermediate said straight portions spaced from said shank and engaging the thread in said handle.

3. In a handle assembly, a cylindrical shank, a helix on the shank, certain portions of said helix being quinquangular in shape, and a handle threadedly engaged with the quinquangular portions aforesaid of said helix.

4. In a handle assembly, a shank, a handle having an internal thread about the shank, and a helix having polygonal portions sleeved upon the shank and engaging the internal thread of said handle.

In testimony whereof I affix my signature.

FRANK KUHN.